United States Patent
Masuda et al.

(10) Patent No.: US 6,715,303 B2
(45) Date of Patent: Apr. 6, 2004

(54) AIR CONDITIONER FOR MOTOR VEHICLES

(75) Inventors: Takafumi Masuda, Kariya (JP); Takahiro Ishihara, Okazaki (JP); Yasutane Hijikata, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/414,193

(22) Filed: Apr. 16, 2003

(65) Prior Publication Data

US 2003/0192326 A1 Oct. 16, 2003

(30) Foreign Application Priority Data

Apr. 16, 2002 (JP) ........................................ 2002-113519

(51) Int. Cl.$^7$ ................................................. B60H 1/32
(52) U.S. Cl. ........................... 62/133; 62/158; 62/228.5
(58) Field of Search ........................ 62/133, 157, 158, 62/243, 323.1, 323.4, 228.5, 229, 230

(56) References Cited

U.S. PATENT DOCUMENTS 4,510,764 A * 4/1985 Suzuki ..................... 62/228.5
4,841,736 A * 6/1989 Suzuki ....................... 62/133
4,862,700 A * 9/1989 Suzuki ..................... 62/228.5
4,880,356 A * 11/1989 Suzuki et al. ................. 62/133
5,018,362 A  5/1991 Nagase et al.
6,481,225 B2 * 11/2002 Kimura et al. ................ 62/133
2002/0069656 A1  6/2002 Niimi

FOREIGN PATENT DOCUMENTS

JP  B2-2-14532  4/1990
JP  A-6-115346  4/1994

* cited by examiner

Primary Examiner—Harry B. Tanner
(74) Attorney, Agent, or Firm—Posz & Bethards, PLC

(57) ABSTRACT

An air conditioner for vehicle has a refrigeration cycle with a variable displacement type compressor. A fuel cut control is carried out in response to a vehicle deceleration. In the fuel cut control, the displacement is first increased so that an evaporator performs as a cold storage. Then, if an engine speed is decreased to a certain level, the displacement is decreased to decrease an engine load. The displacement is kept in the decreased level for a predetermined time period or until the end of the fuel cut control. Even when the displacement is decreased, the evaporator can cool air, since the evaporator performs as the cold storage. Further, the time period for keeping the displacement in the decreased level is limited. Therefore, it is possible to prevent an excessive temperature rise and to keep comfortable air conditioning.

10 Claims, 5 Drawing Sheets

AIR CONDITIONER FOR MOTOR VEHICLES

CROSS REFERENCE TO RELATED APPLICATIONS

This application is based on Japanese Patent Application No. 2002-113519 filed on Apr. 16, 2002 the contents of which are incorporated herein by reference.

BACKGROUND OF THE INVENTION

1. Field of the Invention

The present invention relates to an air conditioner for motor vehicles. The present invention relates to an air conditioner that is capable of keeping comfortable feeling at a fuel cut control of a vehicle engine.

2. Description of Related Art

In a conventional motor vehicle, when the amount of accelerator operation is zero during deceleration, so-called fuel cut control is exercised. That is, the supply of fuel to the vehicle engine is cut off for the purpose of improving fuel economy of the vehicle engine. The engine is an internal combustion engine. The accelerator operation is usually detected as a depression degree of the accelerator pedal. In this case, in order to prevent engine stall, a fuel cut canceling speed is set at a lower-limit engine speed at which the vehicle engine will not stall even if the fuel supply is cut off. The fuel supply is resumed when the engine speed lowers below the predetermined canceling speed.

In a motor vehicle mounted with an air conditioner, the air-conditioner compressor is driven by the vehicle engine. When the compressor is operating, therefore, the vehicle engine drive load becomes greater by the amount of a compressor load torque than when the compressor is not operational. Therefore, the fuel cut canceling speed NEa during compressor operation is set higher by the predetermined speed than the fuel cut canceling speed NEb during a stop of compressor operation as shown in FIG. 4. Therefore, if the compressor is operational, the fuel supply is resumed at a relatively higher engine speed and the fuel supply is resumed relatively earlier. Therefore, when the compressor is driven, the fuel cut time period will become shorter than when the compressor is not driven.

The inventors have studied an experimental system. In this system, in order to extend the fuel cut time period, the canceling speed is decreased as low as the canceling speed when the compressor is not driven. For this purpose, a variable displacement compressor capable of changing the displacement was adopted as an air-conditioner compressor. In addition, the vehicle engine driving load is reduced by reducing the compressor displacement to a small value during vehicle deceleration.

Simply reducing the displacement, however, will present such a problem that, during the summer season when the vehicle compartment is cooled, lowering the cooling capacity of the evaporator raises the temperature of the cold air to be supplied into the vehicle compartment. This will deteriorate a cooling sensation.

JP-A-6-115346 discloses a system that reduces the compressor displacement in order to prevent a vehicle engine stall at a sudden vehicle deceleration. Even this conventional technology also similarly deteriorates the cooling sensation by the lowered cooling capacity of the evaporator.

SUMMARY OF THE INVENTION

It is an object of the present invention to provide an air conditioner for motor vehicles that is capable of keeping comfortable condition even if the displacement of the compressor is reduced in response to deceleration.

According to a first aspect of the present invention, an air conditioner for motor vehicles comprises a refrigeration cycle and a controller. The refrigeration cycle has a variable displacement type compressor and an evaporator for cooling air supplied to a vehicle compartment. The compressor is driven by a vehicle engine that is subjected to a fuel cut control in vehicle deceleration. The controller controls at least the displacement of the compressor. The controller controls the displacement both when the fuel cut control is performed and is not performed. When the vehicle engine is supplied with fuel, that is, the fuel cut control is not performed, the controller controls the displacement on the basis of a cooling degree of the evaporator. When the fuel cut control is performed, the controller performs a forced reduction control of the displacement. In the forced displacement control, the controller reduces the displacement to a predetermined small value. Further, the controller sets a time period for the forced reduction control such that the time period is shortened as a thermal load for cooling is increased.

According to the present invention, a time period for the fuel cut control can be extended by the forced reduction control. Further, the time period for the forced reduction control is shortened as the thermal load for cooling is increased. For example, the time period is shortened as an air temperature to be cooled is increased. Therefore, the temperature rise of the air supplied to the vehicle compartment is restrained by shortening the time period of the forced reduction control of the displacement. Thus it is possible to keep comfortable cooling feeling and to restrain the deterioration of cooling sensation.

The cooling degree of the evaporator may be represented by a temperature or pressure relating to the evaporator such as an air temperature cooled by the evaporator, and an evaporator surface temperature.

The controller may perform a cold storage control when the fuel cut control is performed. The cold storage control may be performed just before the forced reduction control, and be performed by increasing the displacement insomuch that the cooling degree of the evaporator is kept higher than that achieved when the vehicle engine is supplied with fuel. For example, the cooling degree of the evaporator may be controlled higher than a normal degree that is capable of keeping a heat exchanging efficiency high. For example, the temperature of the evaporator in the cold storage control is controlled lower than that in a normal control.

The controller may gradually increase the displacement from a value achieved by the forced reduction control to a value achieved when the vehicle engine is supplied with fuel in response to a finishing of the fuel cut control. It is possible to prevent abrupt change of the air temperature supplied to the vehicle compartment.

The thermal load may be indicated by at least one of an outside air temperature and a volume of air to be supplied to the vehicle compartment. In this case, the time period may be shortened as the outside air temperature is increased or as the volume of air is increased.

The thermal load may be represented by a cooling degree of the evaporator measured actually. In this case, the time period may be shortened by completing the forced reduction control when the cooling degree reaches to a predetermined degree.

The controller may include means for controlling the displacement on the basis of the cooling degree, means for performing the forced reduction control, and means for regulating the time period for the forced reduction control.

The controller may control the displacement to a predetermined large value when information indicative of an engine speed indicates that the engine speed is decreased within a high speed range toward a predetermined engine speed from beginning of the fuel cut control. The controller begins the forced reduction control when the engine speed is decreased in a low speed range below a predetermined level.

The time period may be set by a displacement reduction regulating time. The displacement reduction regulating time may be defined in accordance with both the outside temperature and the volume of air. The displacement reduction regulating time is shortened as the outside temperature is increased when the outside temperature is in a predetermined high temperature range higher than a predetermined first temperature, e.g., 25° C. The displacement reduction regulating time is shortened as the outside temperature is decreased when the outside temperature is in a predetermined low temperature range lower than a predetermined second temperature, e.g., 17° C.

The displacement reduction regulating time may be set at a maximum period at a range located between the predetermined first temperature, e.g., 25° C., and the predetermined second temperature, e.g., 17° C.

The displacement reduction regulating time may be shortened as the volume of air is increased.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
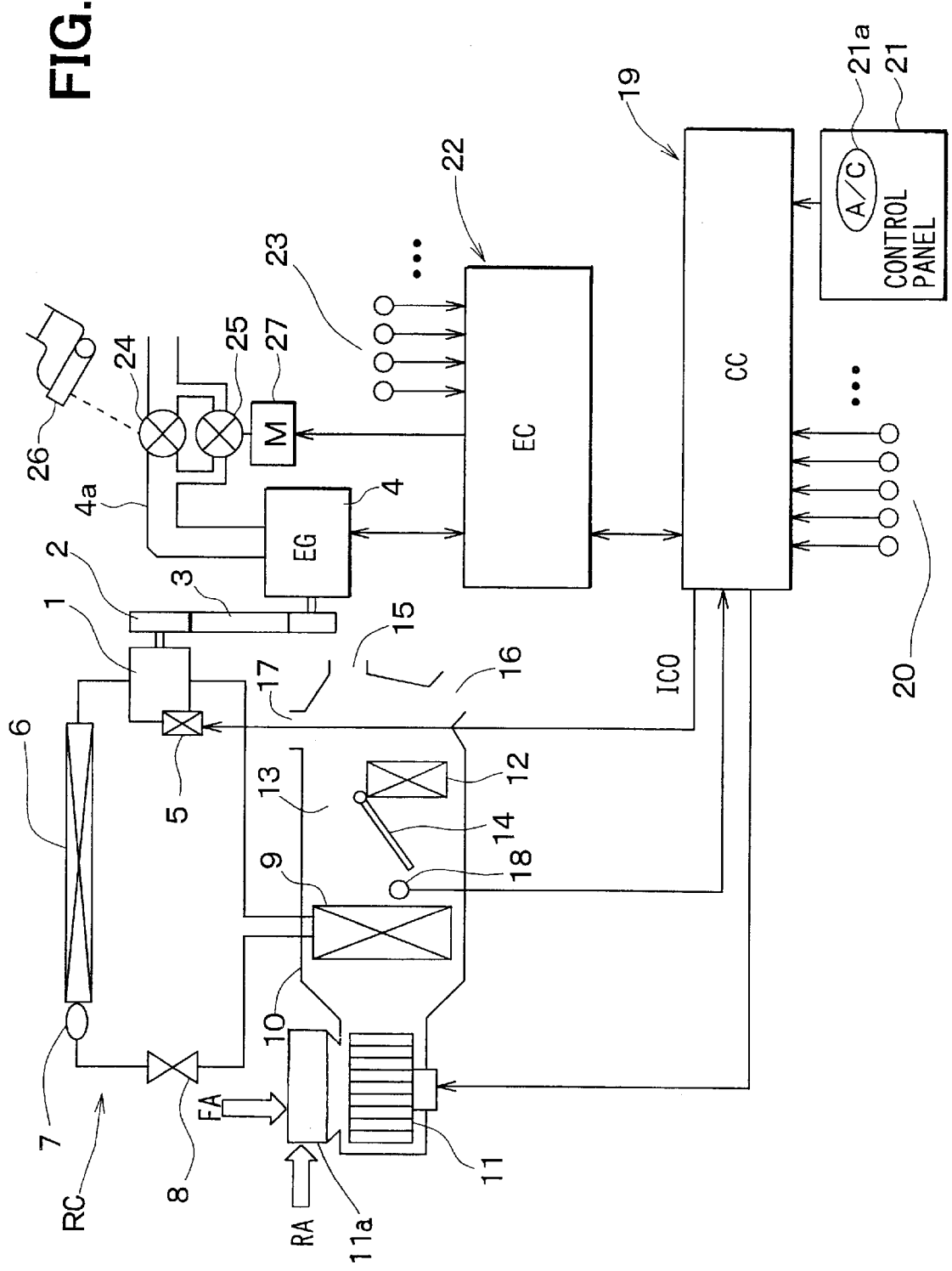
FIG. 1 is a block diagram showing components according to a first embodiment of the present invention.

A first embodiment of the present invention will be described in detail with reference to the accompanying drawings. Referring to FIG. 1, all components are mounted on a motor vehicle. A refrigeration cycle RC is a part of an air conditioner. The refrigeration cycle RC has a compressor 1 which draws in, compresses, and discharges a refrigerant. A vehicle engine (EG) 4 drives the compressor 1 via a pulley 2 and a belt 3.

The compressor 1 is an externally variable displacement type compressor. The displacement can be changed in accordance with a control signal externally applied to the compressor 1. Several types of the externally variable displacement compressor are known and those compressors may be used as the compressor 1. A swash plate compressor for example is provided with a displacement changing device 5 having an electromagnetic pressure controller which controls the pressure of a swash plate chamber by utilizing a discharge pressure and a suction pressure. The device can continuously change the piston stroke, that is, the displacement of the compressor, within the range of about 0% to 100% by controlling the pressure of the swash plate chamber to change the angle of inclination of the swash plate.

In the refrigeration cycle RC, a high-temperature, high-pressure overheat gas refrigerant discharged from the compressor 1 flows into a condenser 6. At the condenser 6, the refrigerant is cooled and condensed by a heat-exchange with the outside air. Preferably, a cooling fan is installed upstream side or downstream side of the condenser 6. The refrigerant condensed at the condenser 6 then flows into a liquid receiver 7, in which the refrigerant is separated into a vapor and a liquid. Excessive liquid refrigerant in the refrigeration cycle RC is reserved in the liquid receiver 7.

The liquid refrigerant from the liquid receiver 7 is decreased to a refrigerant at a lower side pressure by means of an expansion valve 8 of a pressure-reducing means, becoming a two-phase lower side pressure refrigerant of vapor and liquid. The lower side pressure refrigerant from the expansion valve 8 flows into an evaporator 9. The evaporator 9 is an inside heat exchanger for an air-conditioner. The evaporator 9 is located in the casing 10 of the air conditioner. The lower side pressure refrigerant that has entered the evaporator 9 is evaporated, and absorbs heat from the air in the air-conditioner casing 10. The refrigerant outlet of the evaporator 9 is connected on the suction side of the compressor 1, thus constituting a closed circuit of components of the aforesaid cycle.

The air-conditioner casing 10 provides an air passage of the air-conditioner. In the air-conditioner casing 10, a blower 11 is mounted at the upstream side of the evaporator 9. An intake changeover box 11a is provided on the inlet side of the blower 11. The intake changeover box 11a selectively intakes an inside air of the vehicle compartment as a recirculation air RA when a recirculation mode is selected. The intake changeover box 11a selectively intakes an outside air as a fresh air FA when a fresh mode is selected. The recirculation air RA or the fresh air FA is selected and sent into the air-conditioner casing 10 by the blower 11.

At the downstream side of the evaporator 9 in the air-conditioner casing 10, there is located a hot-water heater core 12 for heating the air by using a cooling water for the engine 4 as a heat source. The hot-water heater core 12 forms an air-conditioner heat exchanger. A bypass passage 13 is formed beside the hot-water heater core 12. The mixture ratio of the hot air passing through the hot-water heater core 12 and the cold air passing through the bypass passage 13 is regulated by means of an air mix door 14. The air mix door 14 constitutes a temperature control means which controls the temperature TAA of air to be supplied into the vehicle compartment by regulating the mixture ratio of the hot and cold air.

Furthermore, at the downstream end of air of the air conditioner casing 10 are formed a face air outlet 15 at which the conditioned air is supplied toward the upper body of occupants in the vehicle compartment, a foot air outlet 16 at which the conditioned air is supplied toward the foot area of the occupants, and a defroster air outlet 17 at which the air is supplied against the inside surface of the window glass. These air outlets 15 to 17 are selectively opened and closed by an unillustrated mode selector door. The air mix door 14 and the mode selector door are driven by an electric drive means such as a servo motor through a link mechanism. Furthermore, immediately after the air outlet of the evaporator 9 in the air conditioner casing 10, an evaporator outlet air temperature sensor 18 is mounted as a means for detecting the degree of cooling at the evaporator.

Supply of electric power to the displacement changing device 5 of the compressor 1 is controlled by an air conditioner control unit (CC) 19. For example, increasing the control current ICO of the displacement changing device 5 changes the displacement of the compressor toward increasing. Therefore, the displacement of the compressor 1 is increased or decreased by increasing or decreasing the control current ICO, thereby increasing or decreasing the flow rate of refrigerant delivered from the compressor (the flow rate of refrigerant per unit time) to thereby increase or decrease the lower side pressure Ps in the refrigeration cycle.

The cooling amount at the evaporator 9 can be varied and controlled by varying and controlling the lower side pressure Ps. For example, the temperature at the evaporator 9 may indicate the cooling amount at the evaporator 9 and may be controlled to a target temperature by the lower side pressure control. In the embodiment, an air temperature at the air outlet of the evaporator 9 indicates the temperature at the evaporator 9. The target temperature corresponds to a target pressure of the lower side pressure Ps. Consequently, it is possible to perform several controls such as a frost control of the evaporator 9, a control of driving load of the compressor and a control for reducing the driving load of the compressor 1.

The value of the control current ICO can be changed by duty control in the embodiment, but may be directly increased or decreased not by the duty control.

The compressor 1 of the present example reduces its displacement to the minimum value as low as about 0%, and is not provided with an electromagnetic clutch for interrupting the operation of the compressor 1. Therefore, the electromagnetic clutch may be added to the compressor 1, so that the current supply to the electromagnetic clutch will be interrupted when the compressor displacement has decreased as low as about 0%, to thereby stop the operation of the compressor 1.

The air conditioner control unit 19 is fed with detection signals from not only the aforesaid sensor 18 but also known sensors 20 for detection of conditions such as an inside air temperature, an outside air temperature, a value of solar radiation, and an engine cooling water temperature. Also operation signals are fed in from operation switches, for example an air conditioner switch 21a, on the air conditioner control panel 21 located in the vicinity of the instrument panel in the vehicle compartment.

Furthermore, the air conditioner control unit 19 is connected to an engine control unit (EC) 22 via an inter-controller communication line. Signals, therefore, can be inputted and outputted between these two controllers 19 and 22.

The engine control unit 22, as known, comprehensively exercises control of the quantity of fuel to be injected into the vehicle engine 4 and ignition timing according to signals fed from sensors 23 which detects operating conditions of the vehicle engine 4.

A throttle valve 24 is disposed in the intake air passage 4a of the vehicle engine 4. An idle speed control valve 25 is connected in parallel with the throttle valve 24. The amount of opening of the throttle valve 24 is adjusted by means of an accelerator pedal 26 operated by the vehicle driver. The idle speed control valve 25 has an actuator 27 comprising a stepping motor, etc. The amount of opening of the idle speed control valve 25 is adjusted by the actuator 27.

The air-conditioner control unit 19 and the engine control unit 22 may be composed of separate microcomputers or a common microcomputer.

Figure 2:
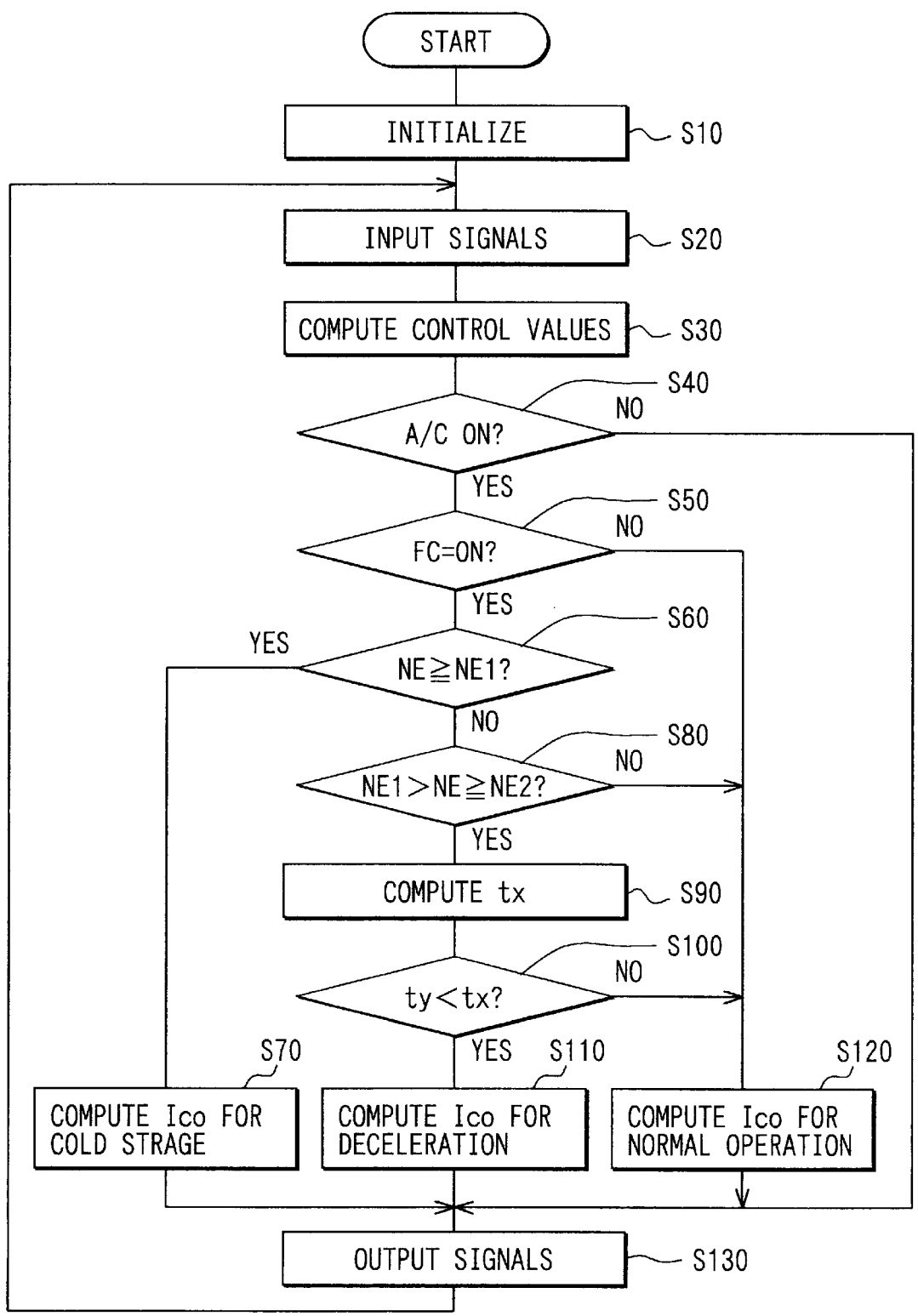
FIG. 2 is a flowchart showing an air-conditioner control according to the first embodiment of the present invention.

Next, operation of the present embodiment will be explained. Referring to FIG. 2, the routine shown in FIG. 2 begins with the start of the air conditioner. In step S10, the air-conditioner control unit 19 initializes settings such as variables, timers and control flags. Then, in step S20, various signals are inputted.

For instance, in step S20, a controller 19 inputs sensor signals such as an evaporator outlet temperature TE from the sensor 18, an inside air temperature TR, an outside air temperature TAM, a value of solar radiation TS, and an engine cooling water temperature TW from the sensors 20. The controller 19 also inputs a signal of a set temperature Tset and a signal of a compressor operation command for operating the compressor 1 from the switches disposed on the air-conditioner control panel 21. Furthermore a fuel cut signal FC and a current value of the engine speed signal NE are inputted from the engine control unit 22.

Figure 3:
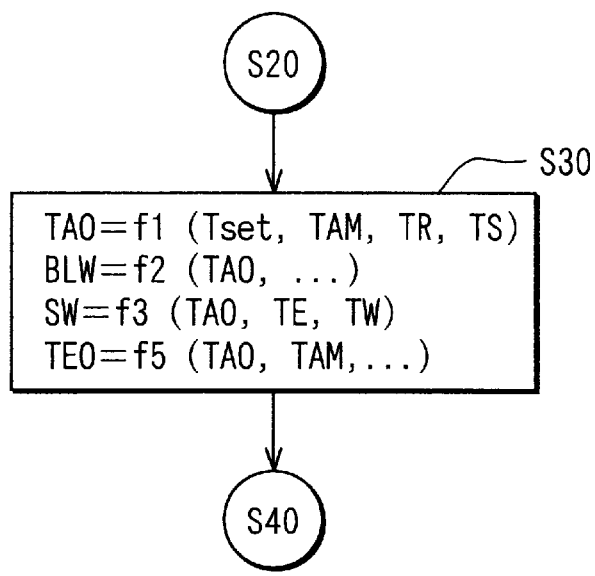
FIG. 3 is a flow chart showing a part of FIG. 2.

Next, various control values for automatic control of the air conditioner are computed in step S30. The computation of these control values may be performed by a known method. FIG. 3 shows a general outline of computation in step S30. The target outlet air temperature TAO is the temperature of air to be supplied into the vehicle compartment, and is needed to keep the set temperature Tset. In this computation, the target outlet air temperature TAO is given by computing the set temperature Tset, the outside air temperature TAM, the inside air temperature TR, and the value of solar radiation TS.

The target air volume BLW of the blower 11 is computed on the basis of the target outlet air temperature TAO. The target amount of opening SW of the air mix door 14 is computed on the basis of the target outlet air temperature TAO, the evaporator outlet air temperature TE, and the engine cooling water temperature TW. Furthermore, the target outlet air temperature TEO of the evaporator 12 is computed on the basis of the target outlet air temperature TAO and the outside air temperature TAM.

Next, in step S40, it is determined whether or not the air conditioner switch 21a on the air conditioner control panel 21 is on. When the air conditioner switch 21a is in an on position, a command is issued to drive the compressor 1 in an operational condition. When the air conditioner switch 21a is in an off position, a command is given to stop the compressor 1. When the air conditioner switch 21a is in off position, no processing is needed to control the compressor displacement in steps S50 to S120. Therefore the program proceeds directly to step S130, to output a control value given by computation in step S30 to each actuator section, to thereby operate each component of the air-conditioner according to the control value.

Then, in step S130, the control current ICO to be supplied to the displacement changing device 5 of the compressor 1 is set to 0 corresponding to the air conditioner switch 21a which is off. That is, the capacity of the compressor 1 is reduced to the minimum capacity as close as 0.

When the air conditioner switch 21a is in the on position, the program proceeds to step S50. In step S50, it is decided whether or not the fuel cut control is executed by evaluating the fuel cut signal FC from the engine control unit 22. The engine control unit 22 is adapted to detect a condition in which the accelerator pedal is not depressed, and to execute the fuel cut control and output the fuel cut signal FC in response to the detection of no depression of the accelerator pedal. Therefore, if the driver release the accelerator pedal to decelerate the vehicle, the fuel cut control is executed by the engine control unit 22 and is informed to the air-conditioner control unit 19.

Figure 4:
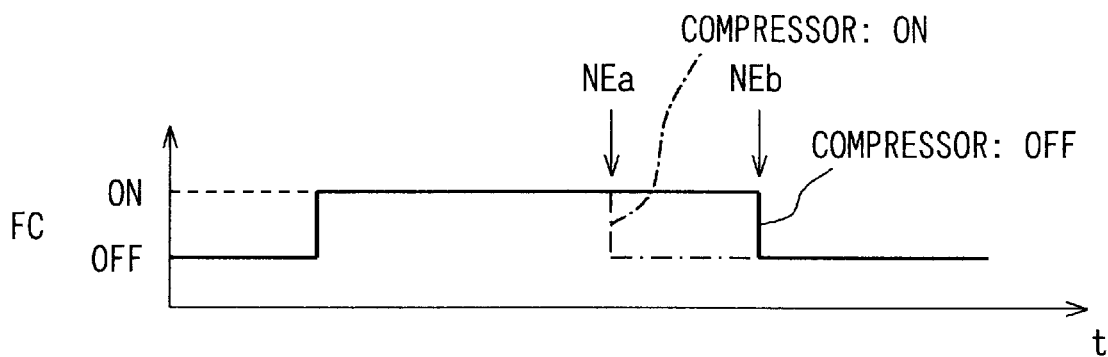
FIG. 4 is a timing diagram showing the fuel cut control according to the first embodiment of the present invention.

In step S50, it is determined whether or not the fuel cut signal FC is produced. When the fuel cut signal FC is produced, it is determined in subsequent step S60 that the engine speed NE of the vehicle engine 4 exceeds the first set speed NE1. The first set speed NE1 corresponds to the fuel cut canceling speed NEa in FIG. 4, that is, a relatively high range speed at which the vehicle engine 4 will not stall notwithstanding the compressor 1 is in operation.

Therefore, when the engine speed NE satisfies NE≧NE1, the program proceeds to step S70. In step s70, a value of the compressor displacement for using the evaporator 9 as a cold storage is computed. During deceleration, the inertia power of vehicle body is collected to drive the compressor 1. When the engine speed NE satisfies NE≧NE1, the compressor displacement is therefore increased to lower the temperature of the evaporator 9. As a result, the evaporator 9 performs as a cold storage.

Figure 5:
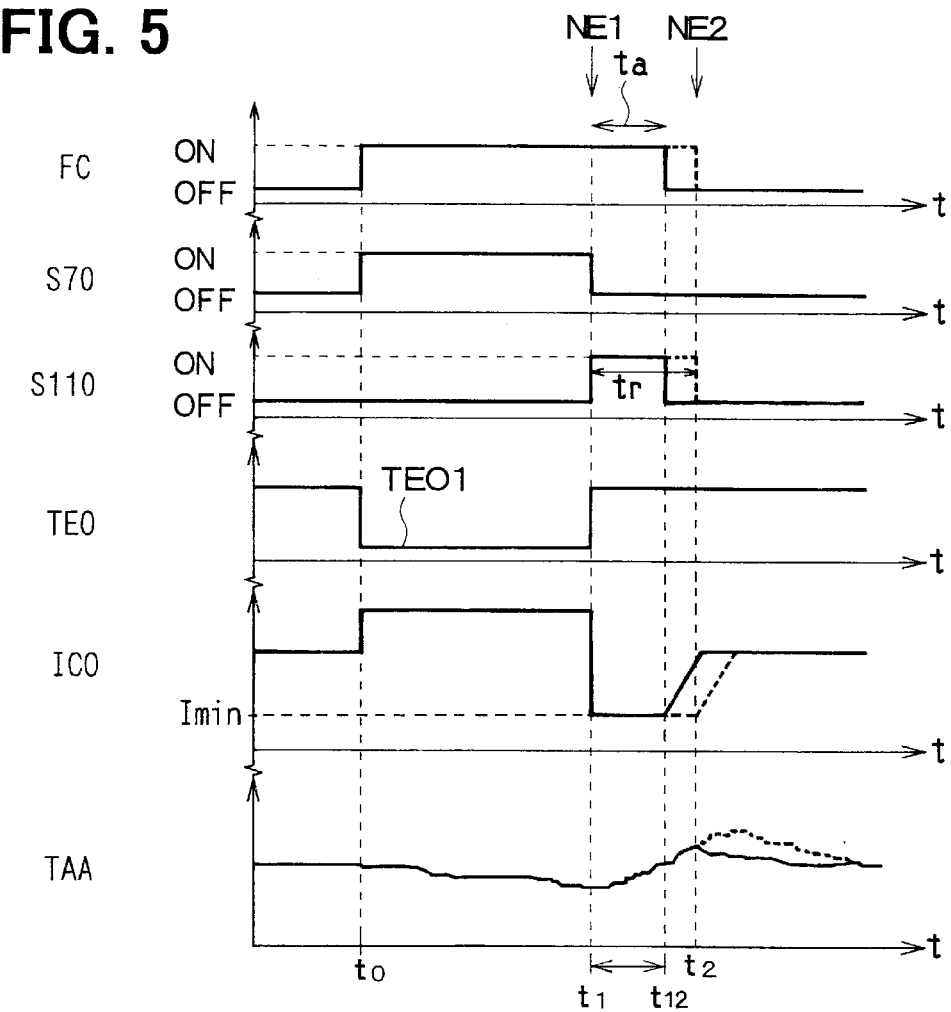
FIG. 5 is a timing chart showing an operation of the first embodiment of the present invention.

Next, the computation performed in step S70 will be explained in detail with reference to FIG. 5. In FIG. 5, the depression degree of the accelerator pedal reaches 0 at a time t0 and the fuel cut control is commenced to stop fuel supply. Then, the fuel cut control is continued to a time t1. The engine speed NE is gradually decreased during a time period from the time t0 to the time t1. The air-conditioner control unit 19 executes the step S70 during this period between the time t0 and t1. The air-conditioner control unit 19 executes a cold storage control in which the displacement of the compressor 1 is controlled to store cold in the evaporator 9. The displacement of the compressor 1 is increased higher than that required to cool air passing through the evaporator 9 at a target level, e.g., the target evaporator outlet air temperature TEO. Therefore, the evaporator 9 is cooled below a usual level and performs as a cold storage device.

The displacement control of the compressor 1 is a feedback control such as the proportional and integral control. The feedback control is designed to vary the control current ICO such that a deviation EN approaches to a predetermined value. For example, the deviation EN is provided by EN=TE−TEO, where TE is an actual value of the evaporator outlet air temperature detected by the temperature sensor 18, and TEO is the target evaporator outlet air temperature. The control current ICO may be calculated on the basis of the deviation EN. As a result, the displacement is controlled to make the actual value TE approaches to the target value TEO. In this embodiment, increasing the control current ICO increases the displacement of the compressor 1.

In step S70, the computation of the compressor displacement for cold storage in the evaporator is carried out. More specifically, in the time period between the time t0 and the time t1, the target evaporator outlet air temperature TEO is set at a temperature TEO1, e.g., about 1° C., that is lower by than the lowest target temperature, e.g., 3° C. to 4° C., in normal air conditioning. The deviation EN is computed by EN=TE−TEO1. Thus the deviation EN is increased to increase the control current ICO to a value ICO1. Consequently, the displacement of the compressor 1 is increased to achieve a greater cooling capacity at the evaporator 9, thereby enabling cold storage in the evaporator 9.

When the time has further elapsed over the time t1 after vehicle deceleration and the engine speed NE has decreased under the first set speed NE1, the decision NO is indicated in step S60, and therefore the control program proceeds to step S80, where a decision is made on whether the engine speed NE is between the first set speed NE1 and the second set speed NE2. The second set speed NE2 is lower by a predetermined value than the first set speed NE1, corresponding to the canceling speed NEb in FIG. 4. That is, the speed NE2 is a speed close to the lower limit of the speed range within which the vehicle engine 4 will not stall when the compressor is at a stop.

Figure 6:
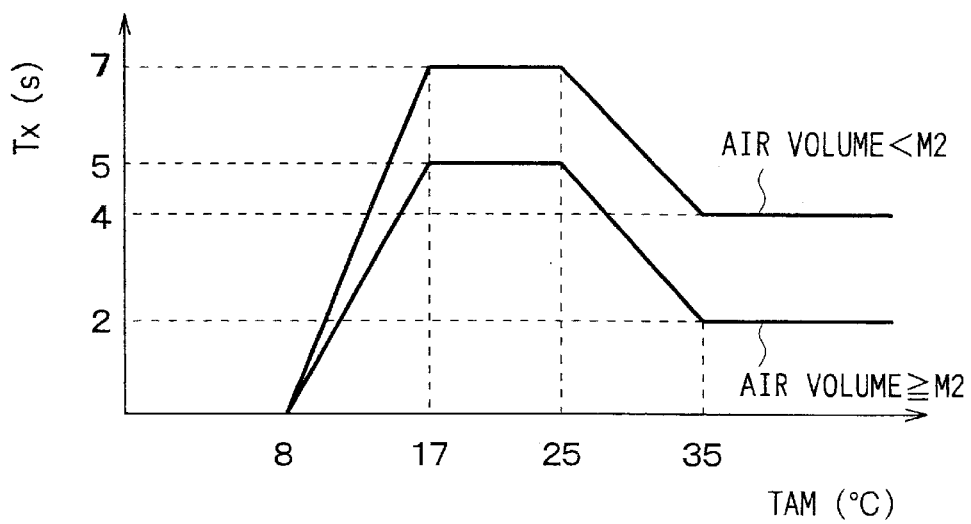
FIG. 6 is a graph showing relationships between a displacement reduction regulating time tx and an outside temperature TAM according to the first embodiment of the present invention.

When NE is within the range between NE1 and NE2, the program proceeds to step S90, where the displacement reduction regulating time tx, seconds, for regulating a time period for decreasing the displacement is computed. FIG. 6 gives an example of a practical method of computation of the displacement reduction regulating time tx, which is determined by the outside air temperature TAM and the air volume level at the blower 11. Details of FIG. 6 will be described later.

Subsequently in step S100, it is determined whether or not an elapsed time ty after the time t1 is within the displacement reduction regulating time tx. When ty<tx is met, the program proceeds to step S110 to compute the minimum displacement during deceleration. For instance, the minimum current for setting the minimum displacement is computed as the control current ICO. Therefore, in step S110 the control current ICO is determined regardless of the deviation EN.

Then, if the elapsed time ty exceeds the displacement reduction regulating time tx, the program branches from step S100 to step S120. In step S120, a normal displacement computation is performed. In this step, the control current ICO is computed on the basis of the deviation EN. The deviation is computed by EN=TE−TEO, where the target temperature TEO is the normal value, e.g., 3° C. to 4° C. The compressor displacement is adjusted in accordance with the control current ICO. Therefore, the actual value of the evaporator outlet air temperature TE approaches to the target evaporator outlet air temperature TEO that is higher than that in step 70. In FIG. 5, step S110 is executed from the time t1 to a time t12. If the system does not have step S100, step 110 may be executed until a time t2, and waveforms may be delayed as shown in FIG. 5 by broken lines.

When it is decided that ty≧tx is met in step S100, the air-conditioner control unit 19 outputs a signal indicative of the decision to the engine control unit 22. The engine control unit 22 resumes the supply of fuel to the vehicle engine 4 in response to the signal from the air-conditioner control unit 19 and turns off the fuel cut signal FC.

Then, if the engine speed NE drops below the value NE2, NE<NE2 is met in step S80, and the program directly proceeds to step S120 to compute the displacement for normal operation. That is, if NE drops below NE2, the displacement control is resumed to the normal control by step S120 even if the elapsed time ty has not reached to the displacement reduction regulating time tx. When NE<NE2 is met in the fuel cut control executed in the engine control unit 22, the fuel supply is resumed and the fuel cut signal FC is turned off.

During normal operation of the vehicle, the fuel cut signal FC is kept turning off. Therefore the program directly proceeds from step S50 to step S120, to perform computation of displacement in normal operation.

If the fuel cut signal FC is turned off after setting the compressor displacement to the minimum value, the program proceeds from step S50 to step S120. In this transitional phase, the displacement is increased from the minimum displacement to the displacement determined by the feedback control. In this transitional phase, step S120 gradually increases the displacement in order to reduce an engine stall. For instance, the control current ICO is gradually increased after the time t12 as shown in FIG. 5.

Next, advantages of this embodiment will be described in detail by referring to FIGS. 5 to 7. When the engine speed NE is higher than the first set speed NE1, immediately after starting deceleration, the vehicle engine is running within a high speed range in which the vehicle engine 4 will not stall despite the compressor 1 is operating. Therefore, when NE≧NE1 is met, the temperature of the evaporator 9 is lowered by executing the displacement computation that increases the compressor displacement in step S70. As a result, it is possible to use the evaporator 9 as a cold storage. Therefore, even if the displacement is decreased later, it is possible to reduce and suppress the temperature rise of the air to be supplied into the vehicle compartment by discharging stored cold thermal energy in the evaporator 9.

If the engine speed reaches lower than the first set speed NE1 at the time of deceleration, the compressor displacement is reduced to the minimum value. Thus, driving loads of the vehicle engine 4 on the compressor can be decreased nearly as low as the zero level to prevent engine stall. Due to the reduced driving load, a decreasing rate of the engine speed is lowered, and it is delayed to reach the engine speed NE to the second set speed NE2. Therefore it is possible to extend the fuel cut time period for a time period ta as shown in FIG. 5.

Furthermore, the displacement reduction regulating time tx at the time of deceleration is computed to limit the displacement reduction time ty within the regulating time tx by steps S90 and S100. Therefore, it is possible to restrain the deterioration of the cooling sensation resulting from the reduction of the compressor displacement after cutting off the fuel supply.

Figure 7A:
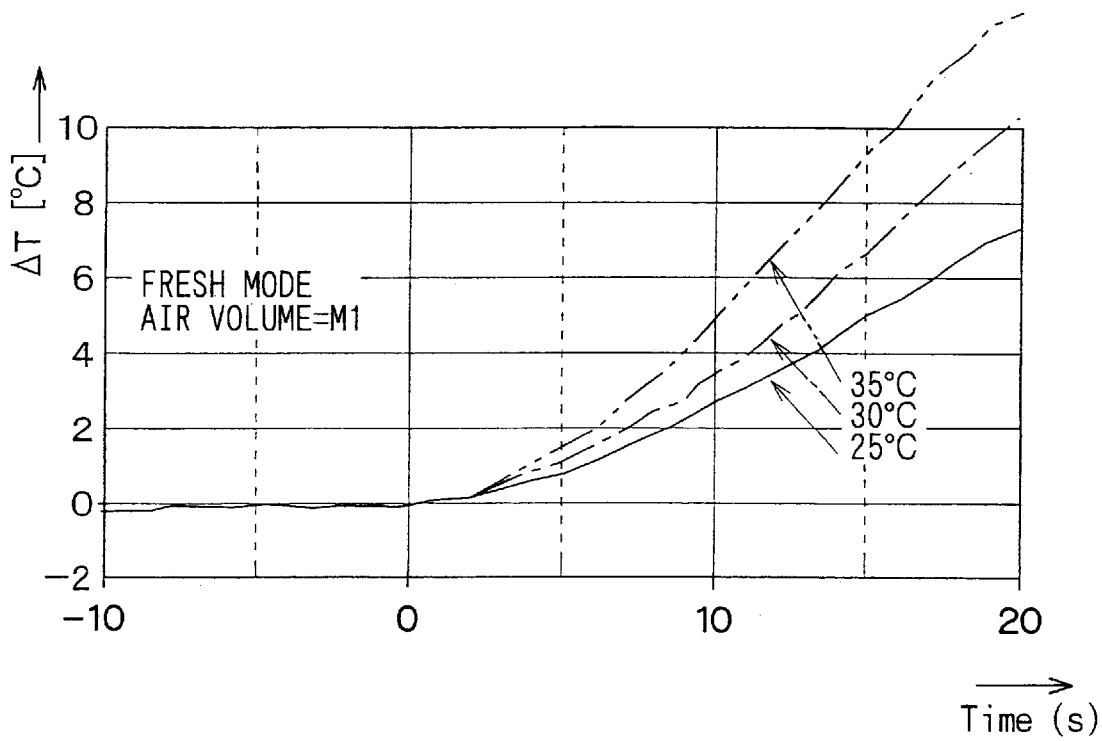
FIG. 7A is a timing diagram showing curves of a temperature rise ΔT under several outside temperature conditions.
Figure 7B:
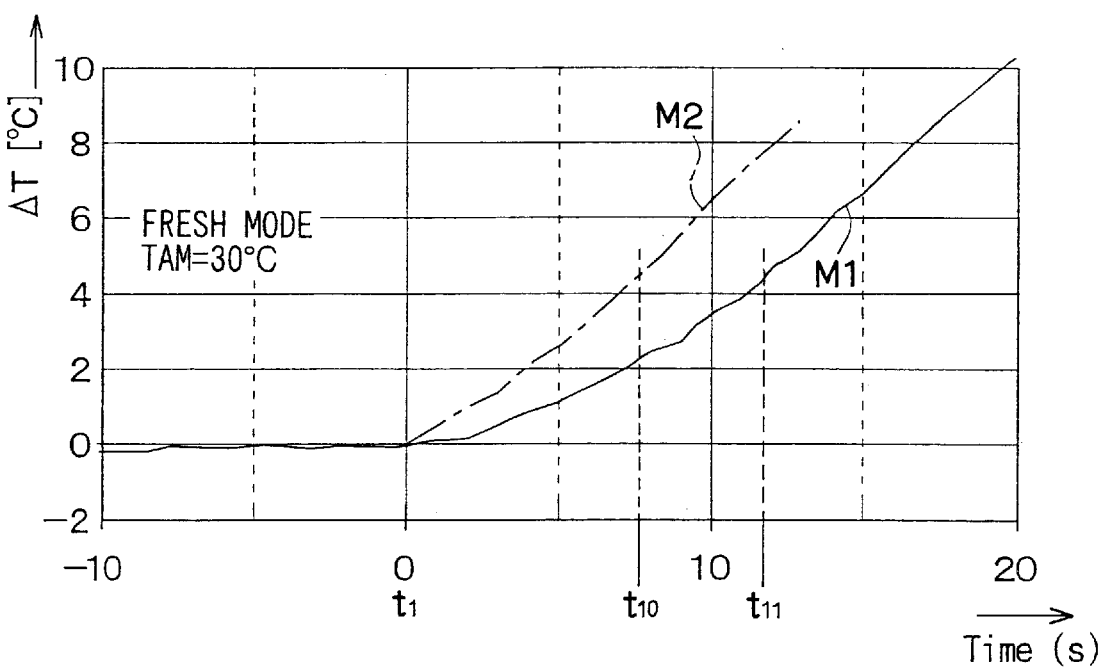
FIG. 7B is a timing diagram showing curves of a temperature rise ΔT under several air volume conditions.

In FIG. 5, the solid lines indicate waveforms according to the embodiment. The broken lines indicate waveforms according to a comparative embodiment that does not have steps 90 and 100. In case of the comparative example, the fuel cut control is finished at the time t2 because of decreasing the engine speed NE below the second set speed NE2. According to this comparative example, the displacement is kept at the minimum displacement for a time period tr that is the same as the time period between the time t1 and the time t2. During this period, the displacement control current ICO is decreased and kept at the minimum current. According to the comparative example, the temperature of air supplied into the vehicle compartment rises as indicated by the broken line in the bottom column of FIG. 5. Therefore, passengers in the vehicle compartment may feel uncomfortable temperature rise. That is, the comparative example may deteriorate cooling sensation of the passengers during air-conditioning operation in the summer season. FIGS. 7A and 7B show experimental results of the inventors. FIGS. 7A and 7B shows the temperature rise ΔT of conditioned air supplied into the vehicle compartment after the compressor displacement is reduced to the minimum value. The horizontal axis show time, time=0 corresponds to the time t1 in FIG. 5. That is, the compressor displacement is changed to the minimum displacement at time=0.

FIG. 7A shows curves of the temperature rise ΔT of air supplied into the vehicle compartment after the displacement is changed to the minimum displacement at 0. FIG. 7A also shows that the outside air heat load indicated by the outside air temperature TAM affects the curves of the temperature rise ΔT. In FIG. 7A, the curves of the temperature rise ΔT are measured under several outside air temperature conditions such as TAM=25° C., TAM=30° C., and TAM=35° C. All curves are measured under a condition in which the intake mode is the fresh mode, the air volume level is M1, and the vehicle speed is 20 km/h. The air volume level M1 corresponds the seventh level out of 31 levels.

FIG. 7B shows curves of the temperature rise ΔT of air supplied into the vehicle compartment after the displacement is changed to the minimum displacement at 0. FIG. 7B shows that the air volume affects the temperature rise ΔT. As shown in FIG. 7B, an increasing rate of the temperature rise ΔT is greater when the air volume level is M2 than that when the air volume level is M1. The air volume level M2 is greater than the air volume level M1 and corresponds to the 13th level out of the 31 levels. The curves in FIG. 7B are measured under a condition in which the intake mode is the fresh mode, the outside air temperature TAM is 30° C., and the vehicle speed is 20 km/h.

It has been confirmed by a sensory rating that, in the case of the air volume level=M2, if the time of about 8 seconds has elapsed, at a time t10, after the change to the minimum displacement, the amount of temperature rise ΔT reaches the vicinity of 4.3° C., causing vehicle occupants to feel uncomfortable. It has also been confirmed by a sensory rating that, in the case of the air volume level=M1, if the time of about 12 seconds has elapsed, at a time t11, after the change to the minimum displacement, the amount of temperature rise ΔT reaches the vicinity of 4.3° C., causing vehicle occupants to feel uncomfortable.

The displacement reduction regulating time tx is determined on the basis of the experimental results of FIGS. 7A and 7B, in relation to a change in the outside air temperature and air volume level as shown in FIG. 6. That is, there is the correlation that the loads on air conditioner of the evaporator 9 increases with an increase in the outside air determined that, within the cooling operation range for cooling the vehicle compartment, in other words, at a high outside air temperature, the displacement reduction regulating time tx is decreased with the rise of the outside air temperature, and also decreased rather when the air volume level≧M2 than when the air volume level<M2. In this embodiment, the high outside air temperature is considered 25° C. or higher as shown in FIG. 6.

Therefore, if the loads on air conditioner of the evaporator 9 increases with the rise of the outside air temperature or with the increase in the air volume level, he displacement reduction regulating time tx is decreased, to thereby enable regulating the elapsed time ty when the compressor displacement is reduced to the minimum value, within the time tx correspondingly to the loads on air conditioner.

Referring to FIG. 5, in the case of the comparative example, the displacement control current ICO is increased from the minimum current at a time t2 at which the engine speed becomes NE<NE2. In the present embodiment, however, the displacement control current ICO is increased from the minimum current at a time t12 that is determined by the time tx and is earlier than the time t2. Such an earlier resuming of the displacement is achieved by limiting a time period for suppressing the displacement.

Therefore, as shown in FIG. 5, the temperature rise of air supplied into the vehicle compartment can be suppressed below the comparative example indicated by the broken line, thereby restraining deterioration of occupants' cooling sensation.

In FIG. 6, within the range of outside air temperature TAM=17° C. to 25° C., the loads on air conditioner decrease in the intermediate seasons of the spring and fall. Furthermore the need for keeping the dehumidifying capacity of the evaporator for defrosting the window glass also decreases. The displacement reduction regulating time tx is therefore set at a maximum to thereby gain the maximum effect of extension of the fuel cut period.

At a low outside air temperature such as below 17° C., the window glass is likely to become foggy with the lowering of temperature thereof. It is, therefore, determined to decrease the displacement reduction regulating time tx with the temperature drop of outside air when the outside air temperature is low. Thus the window glass defogging capacity can be achieved by restraining the deterioration of the dehumidifying capacity of the evaporator at low outside air temperatures.

While one preferred embodiment of this invention has been shown and described hereinabove, it will be understood that the present invention is not to be limited thereto, and many modifications and changes may be made therein.

In the first embodiment, in the computation of the minimum displacement during deceleration in step S110, the displacement control current is decreased to the minimum current to thereby reduce the compressor displacement to the minimum displacement approximately to 0. Instead, in step S110, the compressor displacement may be computed to a value slightly greater than the minimum displacement.

In considering an actual driving and running conditions of the vehicle, the vehicle may be subject to a repetitive deceleration with a short time interval. In this case, if the compressor displacement is thus controlled to a small value at every deceleration, the time regulation alone is not enough to effectively restrain the temperature rise of air supplied into the vehicle compartment. That is, in some cases, the deterioration of cooling sensation can not be restrained. In order to avoid such disadvantage, if the vehicle is decelerated again within a predetermined time after the displacement reduction control is conducted at the time of deceleration, an additional displacement reduction control may be cancelled within the predetermined time. Further, in certain conditions, the fuel supply may be resumed at the time t1 at which the engine speed NE reaches to the threshold NE1 shown in FIG. 5. In this case, the fuel cut control is cancelled at the time t1. Simultaneously, the controller 19 computes the displacement for normal operation in step S120 from the time t1. Therefore, the forced reduction of the compressor displacement is completely cancelled.

In the first embodiment, the displacement reduction regulating time tx is determined on the basis of the outside air temperature TAM and the air volume level. However, a thermal load for cooling is higher in the fresh mode than that in the recirculation mode. Therefore, the intake mode such as the fresh mode and the recirculation mode may be additionally considered as a parameter for determining the displacement reduction regulating time tx. In this case, the displacement reduction regulating time tx in the fresh mode may be decreased compared with that in the recirculation mode.

In the first embodiment, the displacement reduction regulating time tx is computed in step S90, and the time period for reducing the displacement is regulated within the time tx.

However, the computation of the displacement reduction regulating time tx may be abolished and, as a substitute for the regulating time computation, the displacement reduction ending time may be directly determined on the basis of the actual degree of cooling of the evaporator 9. In this case, the displacement reduction time period can be regulated in accordance with a residual amount of cold storage in the evaporator 9.

For example, the displacement reduction control may be finished when the temperature rise $\Delta T$ reaches to a predetermined value. The temperature rise $\Delta T$ is computed by $\Delta T=TE2-TE1$, where TE1 is a value of the outlet air temperature TE of the evaporator 9 at a displacement reduction control start time, e.g., the time t1 in FIG. 5, and TE2 is a present value of the outlet air temperature TE while the displacement reduction control. Such regulating system for the displacement reduction control time period is also effective to keep comfortable condition even the displacement reduction control is executed.

As another example of a similar concept, there is found a temperature difference between the actual outlet air temperature TE of the evaporator 9 after the start of the displacement reduction control and the target evaporator outlet air temperature TEO. The displacement reduction control may be finished when the temperature difference has increased to a predetermined value.

In the first embodiment, the three displacement computation modes are selected in accordance with a comparison result between the engine speed NE and the first and second set speeds NE1 and NE2. However, instead of the engine speed, the vehicle speed may be used, since there is a specific relationship between the engine speed NE and the vehicle speed. For example, the first and second set vehicle speeds may be provided as substitutes for the first and second set speeds NE1 and NE2 as threshold values for decision. In this case, the displacement computation modes are selected in accordance with a comparison between the first and second set vehicle speeds and the present value of the vehicle speed.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What claimed is:

1. An air conditioner for motor vehicles, the motor vehicles perform a fuel cut control to cut off fuel supply to a vehicle engine in vehicle deceleration, the air conditioner comprising:

a compressor driven by the vehicle engine, the compressor being a variable displacement type and being component of a refrigeration cycle;

an evaporator which is a component of the refrigeration cycle, and cools air to be supplied to a vehicle compartment; and a controller which controls the displacement of the compressor, wherein the controller controls the displacement on the basis of a cooling degree of the evaporator when the vehicle engine is supplied with fuel, the controller performs a forced reduction control of the displacement by reducing the displacement to a predetermined small value when the fuel cut control is performed, and the controller sets a time period for the forced reduction control such that the time period is shortened as a thermal load for cooling is increased.

2. The air conditioner for motor vehicles as claimed in claim 1, wherein the controller performs a cold storage control when the fuel cut control is performed, the cold storage control being performed just before the forced reduction control, and being performed by increasing the displacement insomuch that the cooling degree of the evaporator is kept higher than that achieved when the vehicle engine is supplied with fuel.

3. The air conditioner for motor vehicles as claimed in claim 1, wherein the controller gradually increases the displacement from a value achieved by the forced reduction control to a value achieved when the vehicle engine is supplied with fuel in response to a finishing of the fuel cut control.

4. The air conditioner for motor vehicles as claimed in claim 1, wherein the thermal load is indicated by at least one of an outside air temperature and a volume of air to be supplied to the vehicle compartment, and the time period is shortened as the outside air temperature is increased or as the volume of air is increased.

5. The air conditioner for motor vehicles as claimed in claim 1, wherein the thermal load is represented by a cooling degree of the evaporator measured actually, and the time period is shortened by completing the forced reduction control when the cooling degree reaches to a predetermined degree.

6. The air conditioner for motor vehicles as claimed in claim 1, wherein the controller includes:

means for controlling the displacement on the basis of the cooling degree of the evaporator when the vehicle engine is supplied with fuel;

means for performing the forced reduction control by reducing the displacement to the predetermined small value when the fuel cut control is performed; and means for regulating the time period for the forced reduction control such that the time period is shortened as the thermal load for cooling is increased.

7. The air conditioner for motor vehicles as claimed in claim 1, wherein the controller controls the displacement to a predetermined large value when an information indicative of an engine speed indicates that the engine speed is decreased within a high speed range toward a predetermined engine speed from beginning of the fuel cut control, and the controller begins the forced reduction control when the engine speed is decreased in a low speed range below a predetermined level.

8. The air conditioner for motor vehicles as claimed in claim 4, wherein the time period is set by a displacement reduction regulating time that is defined in accordance with both the outside temperature and the volume of air, the displacement reduction regulating time being shortened as the outside temperature is increased when the outside temperature is in a predetermined high temperature range higher than a predetermined first temperature, and the displacement reduction regulating time being shortened as the outside temperature is decreased when the outside temperature is in a predetermined low temperature range lower than a predetermined second temperature.

9. The air conditioner for motor vehicles as claimed in claim 8, wherein the displacement reduction regulating time is set at a maximum period at a range located between the predetermined first temperature and the predetermined second temperature.

10. The air conditioner for motor vehicles as claimed in claim 8, wherein the displacement reduction regulating time is shortened as the volume of air is increased.

* * * * *